Nov. 29, 1932.  E. L. McGREGOR  1,889,486
AGRICULTURAL MACHINE
Filed April 23, 1931   2 Sheets-Sheet 1
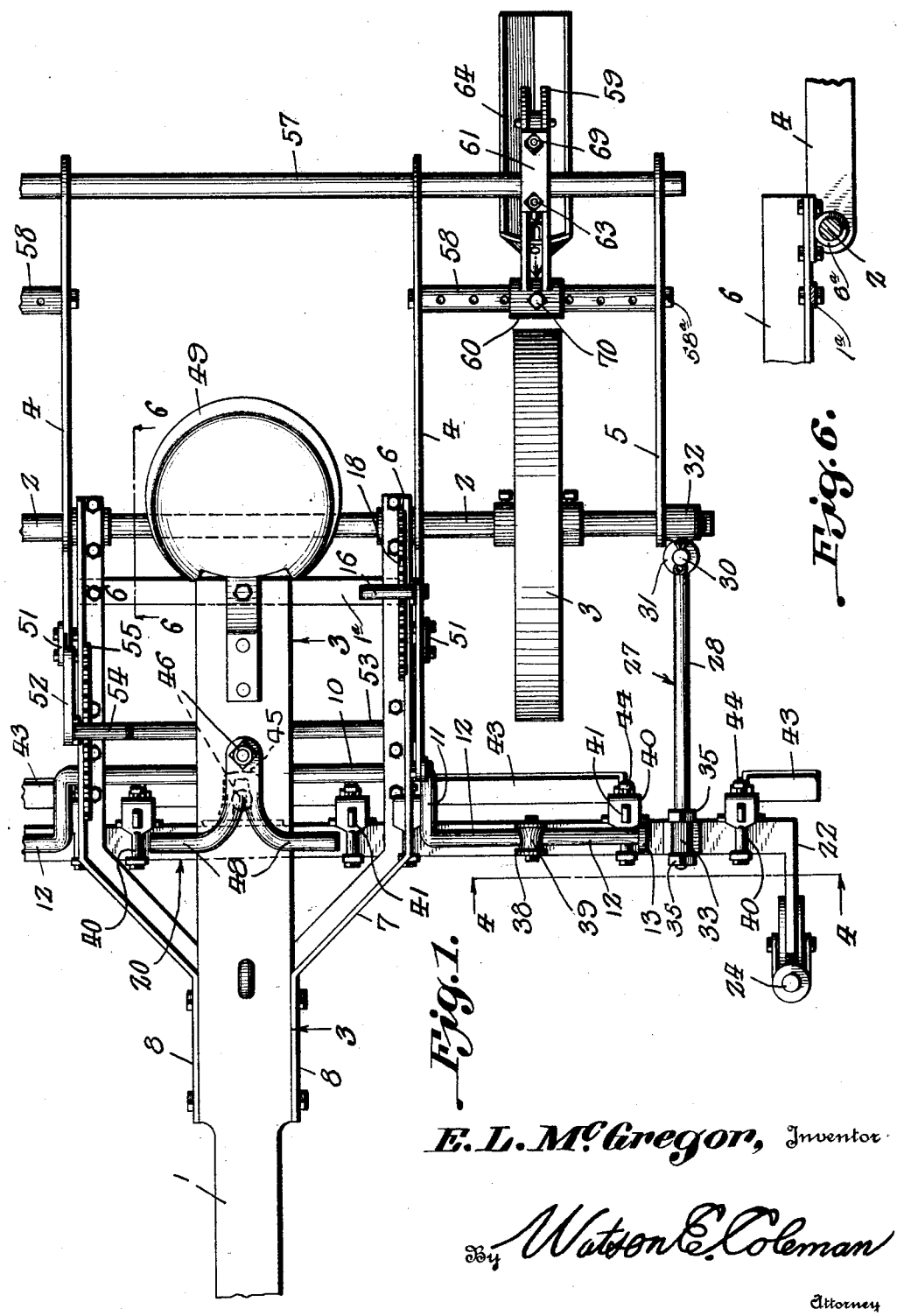
E. L. McGregor, Inventor
By Watson E. Coleman
Attorney

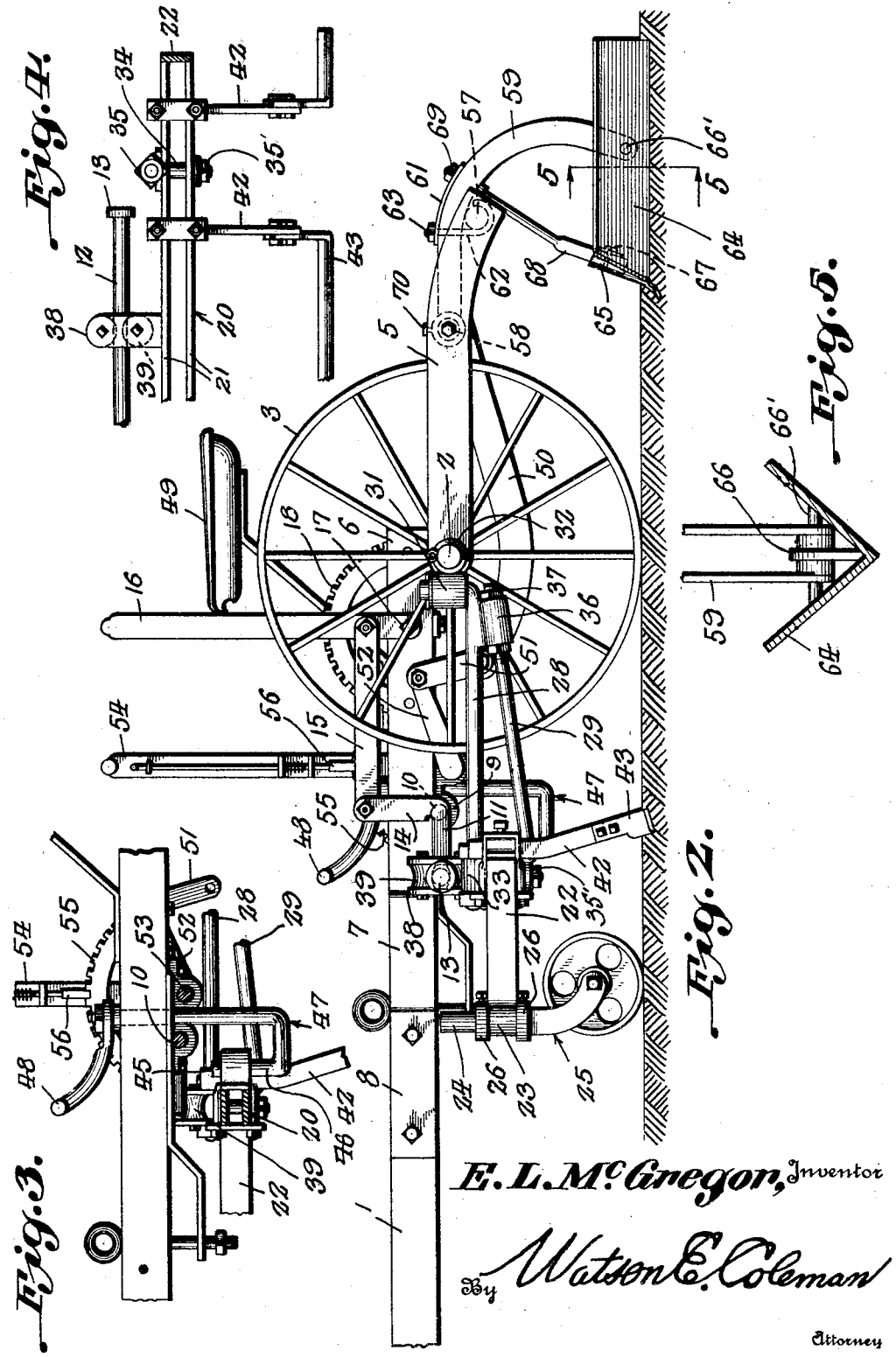

Patented Nov. 29, 1932

1,889,486

UNITED STATES PATENT OFFICE

EUGENE L. McGREGOR, OF MONTROSE, COLORADO

AGRICULTURAL MACHINE

Application filed April 23, 1931. Serial No. 532,291.

This invention relates to the class of earth working implements or machines and pertains particularly to a new and novel machine having means for adapting the same to use as a marker, planter or the like, and a cultivator attachment therefor.

One of the primary objects of the invention is to provide an attachment for machines of the marker or planter type, upon which the clutivating implements may be mounted, and which may be readily shifted by the operator of the machine to move the implements both transversely and vertically.

Another important object of the invention is to provide a machine having vertically and transversely adjustable beams to which a shovel and smoother, or other attachments may be secured.

Still another object of the invention is to provide a novel means whereby oscillation of the elements carried by the beams may be effected to regulate the depth of penetration of the elements into the earth.

A still further object of the invention is to provide an attachment of the above described character having novel means for effecting the vertical movement thereof, which means is so designed that the shiftable portion of the attachment may be moved laterally thereon if and as desired, without interfering with the vertical movement.

Other objects and advantages of the present invention will become apparent as the description of the same proceeds, and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in top plan of a portion of the machine embodying the present invention.

Figure 2 is a view in side elevation of the same.

Figure 3 is a sectional view taken on the line 3—3 of Figure 1.

Figure 4 is a sectional view taken on the line 4—4 of Figure 1.

Figure 5 is a sectional view taken on the line 5—5 of Figure 2.

Figure 6 is a sectional view taken on the line 6—6 of Figure 1.

Referring more particularly to the drawings, wherein like numerals of reference indicate corresponding parts throughout the several views, the numeral 1 indicates the main beam and draft tongue of a machine constructed in accordance with the present invention and by means of which the machine is moved about. It is, of course, to be understood that the cultivator attachment shown upon the present machine may be readily mounted upon any marker, planter or like machine without making material alterations thereof.

This beam 1 is mounted at its rear end upon a cross beam 1ª and rearwardly of this cross beam is located the machine axle 2 which is supported by the ground engaging wheels 3.

The axle 2 has mounted thereon, at each side of the beam 1, a pair of rearwardly extending beams, the inner one of each pair being indicated by the numeral 4, while the outer one of each pair is indicated by the numeral 5. These beams 4 and 5 support the markers or planters in the manner to be hereinafter more fully described and for the sake of clarity they will be hereinafter referred to as the marker beams. The beams 4 are welded to the axle 2 while the beams 5 are slipped over the ends of the axle so that they may be put on and taken off, as desired.

Disposed at each side of the beam 1 of the machine, in spaced parallel relation thereto, is a beam 6, which, at its rear end, overlies and rests upon the axle 2 while the forward end, which extends a substantial distance forwardly of the axle, has the oblique inwardly directed portion 7 which joins with the terminal forward portion 8, which is parallel with the rear portion of the beam and which is secured, as shown, to the draft beam or tongue 1. As illustrated in Figure 6, the rear end of each of the side beams 6 has secured to the underside thereof a bearing sleeve 6ª through which the axle 2 loosely extends. As will be seen the axle may thus be rotated in these bearings.

These side or lateral beams 6 support, in aligned relation transversely of the machine, the bearings 9 in which is mounted a transverse oscillatable shaft 10. Adjacent each end, this shaft has the right angularly directed portion 11 which connects with a terminal or crank portion 12 which is in spaced parallel relation with the shaft, as shown, and the free end of each of these cranks 12 has a head 13 thereon, the purpose of which will be hereinafter described.

At one side of the machine the shaft 10 has the integral upstanding arm 14 to the upper end of which is connected one end of a link 15. This link 15 has pivotal connection at its other end with a lever 16 which is pivotally mounted, as at 17, upon an adjacent beam 6. Mounted upon the beam 6 which carries the lever 16, and concentric with the point 17, is a rack segment 18 with which the usual pawl mechanism 19, carried by the lever 16, engages.

Extending transversely of the machine in a plane below the tongue 1 is a beam which is indicated generally by the numeral 20 and which is made up of the two spaced parallel bars 21. These bars are joined at each end by one end of a forwardly extending arm 22 which, at its forward end, is formed to provide a vertical bearing sleeve 23 through which the vertical stem 24 of the yoke of a caster wheel, indicated generally by the numeral 25, extends. Collars 26 are adjustably secured to the stem 24 of each caster wheel, one above and the other below the bearing sleeve 23 to facilitate engagement of the caster wheel with the ground when the beam 20 is vertically adjusted in the manner hereinafter described.

The implement carrying beam 20 is supported adjacent each end by an arm, which is indicated as a whole by the numeral 27, and which is made up of the upper and lower members 28 and 29 respectively. The upper member of each arm has its rear end turned upwardly to form a pivot pin 30 which is positioned in the vertical sleeve 31 of a double bearing sleeve unit, the other sleeve 32 being disposed at right angles to the sleeve 31 and designed to receive the adjacent end of the axle 2 in the manner illustrated. The arms 27, as will thus be seen, may have both vertical and horizontal movement.

The forward end of the portion 28 of each arm 27 is threaded and passes through an aperture in the head 33 of a bolt 34 which is vertically disposed and extends downwardly through the beam 20. At the front and rear of this head 33, the member 28 carries a nut 35 to regulate relative movement between the member and the bolt head.

The lower member 29 of each arm is formed at its forward end to receive the lower end of the bolt 33 and is held in place by the nut 35' upon this bolt, while the rear end is threaded and passes through a sleeve 36 which forms an integral part of the member 28 at the rear thereof and the pair of spaced nuts 37 mounted upon this member 29 facilitate the necessary longitudinal adjustment of the two members. At each side of the draft beam 1, the beam 20 has mounted thereon the spaced upstanding ears 38 between which are positioned the spaced rollers 39 and between these rollers there extends the adjacent crank arm 12. The head 13 upon each of the crank arms prevents the disconnection therefrom of the rollers and the beam 20 supported by the cranks.

The beam 20 is provided with a series of U-bolts 40, the legs of which have apertures 41 therethrough for the reception of the supporting arms 42 of earth working implements 43. It will, of course, be understood that any type of earth working implement may be secured to the beam 20 in this manner. The arms 42 are held in position in the openings in the bolts 40 by means of set screws 44.

At a point substantially midway between its ends, the beam 20 carries a sleeve 45 through which there extends from the lower side the vertical arm 46 of a substantially U-shaped member 47, the other arm of this member being materially longer than the arm 46 and extending upwardly through the draft beam 1 for connection with the two oppositely directed foot levers 48. It will be seen from the foregoing that an operator of the machine, when seated upon the seat 49, may readily oscillate the levers 48 with his feet and thus reciprocate the beam 20 transversely of the machine, as desired. In this movement the beam will be supported entirely by the cranks 12 which are in turn carried by the shaft 10 mounted beneath the draft beam.

Each of the rearwardly extending beams 4 has extending forwardly from the underside thereof an arm 50 which is connected by a link 51 with a crank arm 52 carried by the oscillatory shaft 53 which is mounted transversely of the underside of the beams 1 and 6. At the opposite side of the machine from the lever 16 there is mounted a similar lever 54, upon the shaft 53 and adjacent thereto and concentric with the shaft 53, is a rack segment 55 with which the pawl member of the lever 54 may engage.

Extending transversely of the rear portion of the machine is a bar 57, which connects both pairs of beams 4 and 5 and which has the beams 4 welded thereto. The arms 5 are apertured to slidably receive the ends of this bar 57. Disposed between the beams 4 and 5 of each pair is a short bar 58 against the outer end of which the beam 5 abuts and is secured by a screw 58ª. Disposed between the rear ends of each pair of beams 4 and 5 is one end of a curved marker beam 59 which overlies the bar 57 and has a transverse sleeve 60 through which the adjacent bar 58 passes. This beam 59 is in two portions which are spaced apart, as shown, and connecting these portions over the bar 57 is a plate 61 through which the shank portion of a J-bolt 62 passes to be secured thereto by the nut 63.

While any form of plow or earth working element may be mounted upon the lower end of the curved beams 59 there has been shown a smoother 64 upon the forward end of which is positioned a shovel 65. This smoother 64 is V-shaped in cross-section and has extending upwardly from the crotch, between the sides thereof, the apertured plate 66 which positions between the portions of the curved beam 59 at the lower end thereof and is secured to this beam by the transverse bolt 66' in the manner shown. The smoother may thus be oscillated upon the bolt 66' as will be readily seen.

The back of the shovel 65, of each smoother, has secured thereto, by means of the bolt 67, the supporting arm 68 which extends upwardly and passes at its upper end between the members of the beam 59, and through the plate 61. The nuts 69 upon the upper end of each arm, and upon opposite sides of the adjacent beam and plate, facilitate the vertical adjustment of the arm and consequently the depth of penetration of the shovel into the ground. Lateral movement of each of the curved beams 59 may also be effected by loosening the securing screw 70 which passes through each of the sleeves 60 for engagement with the adjacent bar 58, as will be readily understood.

From the foregoing description it will be readily seen that the depth of penetration of the earth working elements 43, and the smoothers or other members carried by the curved beams 59, may be readily controlled by the operator of the machine, the control of the elements 43 being through the medium of the lever 16 which, when oscillated, will raise or lower the crank arms 12 and consequently the structure connected therewith and the control of the curved beams 59, and elements carried thereby, being through the medium of the lever 54 which, when oscillated, will raise or lower the beams 4 and 5 upon the axle 2. It will also be readily seen that by actuating the foot levers 48 with his feet the operator may laterally adjust the beam 20 and associate elements, this movement being permitted by the means employed for supporting it upon the cranks 12 and by the bracing arms 27 which are pivotally connected between the axle and the beam 20 for both vertical and horizontal movement.

It will be readily seen from the foregoing that by mounting the beams 5 in the manner illustrated and described, they may be readily removed from the axle 2 and the bar 57 and from connection with the short bars 58, so that the wheels and markers may be removed when desired.

It is also to be understood that any suitable means may be employed for connecting together the various links and shafts, but it is preferred that all moving connections be secured by nuts and bolts.

Having thus described my invention, what I claim is:—

1. In a machine of the character described having supporting wheels, an axle and a center draft beam supported by the axle, a pair of elongated members disposed longitudinally of the machine, one at each side thereof, pivotal connecting means between the rear end of each member and the machine axle whereby both vertical and horizontal movement of each member may be obtained, a beam disposed transversely of the machine between said members and having pivotal connection with the members for permitting movement in a horizontal plane therewith, a caster wheel supporting each end of the transverse beam, means carried by the transverse beam for attaching earth working elements thereto, an oscillatable member carried by the draft beam and having connection with the transverse beam for effecting lateral shifting of the transverse beam, a shaft mounted transversely of the first mentioned beam, means for rocking said shaft, and connecting means between said shaft and the transverse beam for effecting a lift of the transverse beam upon the rocking of the shaft.

2. In a machine of the character described having supporting wheels, an axle and a center draft beam supported by the axle, a pair of elongated members disposed longitudinally of the machine, one at each side thereof, pivotal connecting means between the rear end of each member and the machine axle whereby both vertical and horizontal movement of each member may be obtained, a beam disposed transversely of the machine between said members and having pivotal connection with the members for permitting movement in a horizontal plane therewith, a caster wheel supporting each end of the transverse beam, means carried by the transverse beam for attaching earth working elements thereto, an oscillatable member carried by the draft beam and having connection with the transverse beam for effecting lateral shifting of the transverse beam, a shaft mounted transversely of the first mentioned beam, means for rocking said shaft, and connecting means between said shaft and the transverse beam for effecting a lift of the transverse beam upon the rocking of the shaft, the said connecting means between the transverse beam and the rocking shaft being such as to continually support the transverse beam during lateral movement.

3. In a machine of the character described having supporting wheels, an axle and a center draft beam supported by the axle, a pair of side beams arranged in spaced parallel relation and having the draft beam disposed therebetween, an elongated member extending longitudinally of the machine at each side thereof and comprising a pair of arms arranged in forwardly diverging relation, a pivotal connecting means between the convergent ends of said arms and the machine axle whereby vertical and horizontal swinging of the members is permitted, a transverse beam disposed between said members and having each end located between and pivotally attached to the arms of the member adjacent thereto, a caster wheel supporting each end of the transverse beam, means carried by said transverse beam for attaching earth working implements thereto, means carried by said side beams and having connection with the transverse beam for effecting the vertical movement thereof, and means carried by the first beam and having connection with the transverse beam for effecting lateral movement thereof.

4. In a machine of the character described having supporting wheels, an axle and a center draft beam supported by the axle, a pair of side beams arranged in spaced parallel relation and having the draft beam disposed therebetween, an elongated member extending longitudinally of the machine at each side thereof and comprising a pair of arms arranged in forwardly diverging relation, a pivotal connecting means between the convergent ends of said arms and the machine axle whereby vertical and horizontal swinging of the members are permitted, a transverse beam disposed between said members and having each end located between and pivotally attached to the arms of the member adjacent thereto, a caster wheel supporting each end of the transverse beam, a shaft extending transversely of and carried by the side beams, a crank arm at each end of said shaft, connecting means between each crank arm and the transverse beam whereby lifting of the latter beam may be effected upon oscillation of the shaft, and a vertical shaft oscillatably mounted upon said first beam and having connection with the transverse shaft whereby upon oscillation the transverse shaft will be shifted laterally.

5. In a machine of the character described having supporting wheels, an axle and a center draft beam supported by the axle, a pair of elongated members disposed longitudinally of the machine, one at each side thereof, a pivot connection between one end of each member and the machine axle whereby vertical and lateral movement of the member is permitted, a transverse beam located between said members, pivotal connecting means between each end of said transverse beam and a member, a pair of spaced upstanding ears carried by the transverse beam adjacent each end, a pair of rollers disposed in vertical spaced relation between each pair of ears, a shaft mounted transversely of the machine and having an offset parallel crank arm at each end disposed between a pair of rollers, means for rocking said shaft to lift the transverse beam, and oscillatory means upon the first beam having connection with the transverse beam for shifting the same laterally, the transverse beam riding upon said crank arms when so shifted.

6. An agricultural machine, comprising a wheel supported axle, a draft beam connected with the axle, a shaft carried by the beam and extending transversely thereof, an implement carrying beam disposed beneath and parallel to said shaft, means connecting said last beam with the shaft adjacent the ends of the latter permitting longitudinal movement of the same thereon, means for attaching earth working implements to said last mentioned beam, means for raising and lowering the portions of the shaft to which the said last beam is connected, and means for effecting the longitudinal movement of the last mentioned beam on the shaft.

7. An agricultural machine, comprising a wheel supported axle, a draft beam connected with the axle, a shaft carried by the beam and extending transversely thereof, an implement carrying beam disposed beneath and parallel to said shaft, a roller connection between the transverse beam and said shaft supporting the transverse beam therefrom, means for shifting the transverse beam longitudinally of the said shaft, means for attaching earth working elements to the transverse beam, and means for raising a portion of the shaft to which said roller is connected.

8. In an agricultural machine, a wheel supported axle, a draft beam carried by the axle, a shaft disposed transversely of said axle and supported thereby for oscillation, each end of said shaft being extended to form an elongated crank arm, the said crank arms being aligned transversely of the machine, a beam disposed transversely of the draft beam beneath and parallel with said aligned crank arms, means connecting said transverse beam with said crank arms permitting longitudinal movement of the transverse beams on the crank arms, a vertical shaft carried by said draft beam having at its lower end a vertically disposed finger, a loose connection between said finger and said transverse beam, means for rocking said vertical shaft to effect longitudinal movement of said transverse beam on said crank arms, means for rocking said transverse shaft for raising or lowering the crank arms and the transverse beam connected thereto, and means for securing earth working implements to the transverse beam.

9. In an agricultural machine, a wheel supported axle, a draft beam, side beams arranged in spaced parallel relation to said draft beam and connected therewith, a bearing connection between the rear end of each of said side beams and said axle, a shaft disposed transversely of said beams and having bearing connection with the side beams for rocking movement thereon, each end of said shaft being extended to form relatively long laterally directed crank arms arranged in alignment transversely of the beams, means for rocking said shaft for the raising of said crank arms, an earth working implement carrying beam disposed transversely of the beams and beneath said crank arms, a guide carried by said transverse beam adjacent each end and having a pair of spaced rollers mounted therein between which one of said crank arms extends, and foot operated means carried by the draft beam and connected with the transverse beam for effecting the longitudinal movement of the latter upon said crank arms.

10. In an agricultural machine a wheel supported axle, a draft beam, side beams arranged in spaced parallel relation to said draft beam and connected therewith, a bearing connection between the rear end of each of said beams and said axle, a shaft disposed transversely of said beams and having bearing connection with the side beams for rocking movement thereon, each end of said shaft being extended to form relatively long laterally directed crank arms arranged in alignment transversely of the beams, means for rocking said shaft for the raising of said crank arms, an earth working implement carrying beam disposed transversely of the beams and beneath said crank arms, a guide carried by said transverse beam adjacent each end and having a pair of spaced rollers mounted therein between which one of said crank arms extends, foot operated means carried by the draft beam and connected with the transverse beam for effecting the longitudinal movement of the latter upon said crank arms, a collar mounted upon each end of said axle and having a vertical bearing integral therewith, a brace arm at each end of said transverse beam and having a vertical terminal portion mounted in the adjacent vertical bearing, and a vertical bearing connection between the other end of the brace arm and the adjacent end of the transverse beam.

11. An agricultural machine, comprising a wheel supported axle, a draft beam connected with the axle, a shaft carried by the beam and extending transversely thereof and having a central portion and outer aligned arm end portions off-set with respect to the central portion, an implement carrying beam disposed beneath and parallel to said shaft, connecting means between said last beam and the arms of said shaft whereby the said last beam is supported by the arms and is movable thereon transversely of the machine, earth working implements carried by the last mentioned beam, and means for oscillating said shaft for effecting the raising and lowering of the arms and the implements carrying beam connected therewith.

12. An agricultural machine, comprising a wheel supported axle, a draft beam connected with the axle, a shaft carried by the beam and extending transversely thereof and comprising a central portion and aligned end arm portions arranged in off-set relation to the central portion, an implement beam disposed beneath and parallel to the said shaft, roller elements carried by said last beam and mounted on said shaft, arms to facilitate the movement of the last mentioned beam transversely of the machine, earth working elements carried by the last mentioned beam, and means for oscillating said shaft to effect the rotation of said arms and the lifting of the implement carrying beam from the ground.

In testimony whereof I hereunto affix my signature.

EUGENE L. McGREGOR.